(12) United States Patent
Pastrik et al.

(10) Patent No.: US 10,151,917 B2
(45) Date of Patent: Dec. 11, 2018

(54) DEVICE FOR HOMOGENIZING LASER LIGHT USING A ROTATING LENS FIELD

(71) Applicant: CHRISTIE DIGITAL SYSTEMS USA, INC., Cypress, CA (US)

(72) Inventors: Darren Pastrik, Kitchener (CA); Daniel Robert Adema, Kitchener (CA); John Domm, Kitchener (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 18 days.

(21) Appl. No.: 15/285,137

(22) Filed: Oct. 4, 2016

(65) Prior Publication Data

US 2018/0095268 A1 Apr. 5, 2018

(51) Int. Cl.
*G02B 26/08* (2006.01)
*G02B 5/02* (2006.01)
*G02B 19/00* (2006.01)
*G02B 27/48* (2006.01)

(52) U.S. Cl.
CPC ....... *G02B 26/0875* (2013.01); *G02B 5/0278* (2013.01); *G02B 19/0014* (2013.01); *G02B 19/0047* (2013.01); *G02B 27/48* (2013.01)

(58) Field of Classification Search
None
See application file for complete search history.

(56) References Cited

U.S. PATENT DOCUMENTS

| 6,574,024 | B1 | 6/2003 | Liu | |
|---|---|---|---|---|
| 2007/0252954 | A1* | 11/2007 | McGuire, Jr. | ...... G02B 27/0101 353/20 |
| 2008/0049315 | A1 | 2/2008 | Morikuni et al. | |
| 2012/0300277 | A1 | 11/2012 | Cobb et al. | |

* cited by examiner

*Primary Examiner* — Jennifer D. Carruth
(74) *Attorney, Agent, or Firm* — Perry + Currier, Inc.

(57) ABSTRACT

A device for homogenizing laser light using a rotating lens is provided. The device comprises: a laser; an integrating rod having an input face; a lens located between the laser and the input face of the integrating rod, the lens having an optical axis, the lens positioned to receive light from the laser, off the optical axis, and focus the light through the input face of the integrating rod; and, an actuator device configured to rotate the lens about an axis of rotation different from the optical axis.

15 Claims, 8 Drawing Sheets

DEVICE FOR HOMOGENIZING LASER LIGHT USING A ROTATING LENS FIELD

FIELD

The specification relates generally to laser light sources for projectors, and specifically to a device for homogenizing laser light using a rotating lens.

BACKGROUND

Transmissive diffusers are often used to diffuse laser light to add angular diversity thereto, to increase laser light homogenization and/or to reduce speckle in projectors which use lasers as light sources. However, such transmissive diffusers for high power laser applications can be expensive and can introduce losses in efficiency; furthermore, at least two such transmissive diffusers are used to achieve adequate laser light homogenization compatible with projectors, which adds further cost and efficiency losses. In addition, as such transmissive diffusers are bulk diffusers, light is angularly diffused equally over a diffuse area, for example onto an input face of an integrating rod, which can result in some of the incident light on the integrating rod remaining as low-angle light, which is not desirable for homogenization as such low-angle light does not sufficiently bounce inside the integrating rod.

SUMMARY

In general, this disclosure is directed to a device that includes an eccentrically rotating lens between a laser light source and an integrating rod, the lens positioned to receive light from the laser, off an optical axis, and focus the light through the input face of the integrating rod as the lens eccentrically rotates. Hence, the lens is further configured to rotate about an axis of rotation different from the optical axis, using an actuator device which rotates the lens about the axis of rotation. Hence, the lens rotates eccentrically as the optical axis is generally through a centre of the lens, while the axis of rotation is off centre. Such eccentric rotation further causes the optical axis to move about the axis of rotation, which causes the light from the laser focussed by the lens to sweep out a pattern at the input face of the integrating rod. As the position at which the laser light is received at the integrating rod changes as the lens is rotated, homogenization of the light from the laser can increase as it passes through the integrating rod, at least relative to devices where light from the laser enters an integrating rod in a stationary position. In addition, the lens can comprise a diffuser on a side facing the integrating rod, which further homogenizes the light; as the lens rotates about an axis of rotation different from the optical axis, an angle of lowest-angle light from one position of the diffuser can increase as the lens rotates.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

An aspect of the present specification provides a device comprising: a laser; an integrating rod having an input face; a lens located between the laser and the input face of the integrating rod, the lens having an optical axis, the lens positioned to receive light from the laser, off the optical axis, and focus the light through the input face of the integrating rod; and, an actuator device configured to rotate the lens about an axis of rotation different from the optical axis.

The axis of rotation can be about normal to a center of the input face of the integrating rod.

The axis of rotation can be fixed relative to the input face of the integrating rod.

A focal point of the lens can be located at one of: at the input face of the integrating rod; proximal the input face of the integrating rod, external to the integrating rod; and proximal the input face of the integrating rod, internal to the integrating rod.

The lens can be configured to focus the light through the input face of the integrating rod at angles greater than about 3° from a normal from the input face of the integrating rod.

The actuator device can be configured to cause one or more of lens and the axis of rotation to wobble as the lens is rotating.

An integrating-rod side of the lens can be configured to diffuse the light.

When the lens is rotated about the axis of rotation, the light can sweep out a pattern at the input face of the integrating rod.

When the lens is rotated about the axis of rotation, the optical axis of the lens can move about the axis of rotation.

The actuator device configured to rotate the lens can comprise one or more of a motor and a servo-motor.

The lens can comprise a plano-convex lens comprising a convex side and a planar side opposite the convex side, the plano-convex lens can be positioned to receive light from the laser at the convex side, off the optical axis, and focus the light through the planar side through the input face of the integrating rod. The planar side of the plano-convex lens can be configured to diffuse the light.

The lens can comprise a double-convex lens. An integrating-rod side of the double-convex lens can be configured to diffuse the light.

The lens can comprise a meniscus lens. An integrating-rod side of the meniscus lens can be configured to diffuse the light.

The lens can comprise an axicon lens. A planar side of the axicon lens can be configured to diffuse the light.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
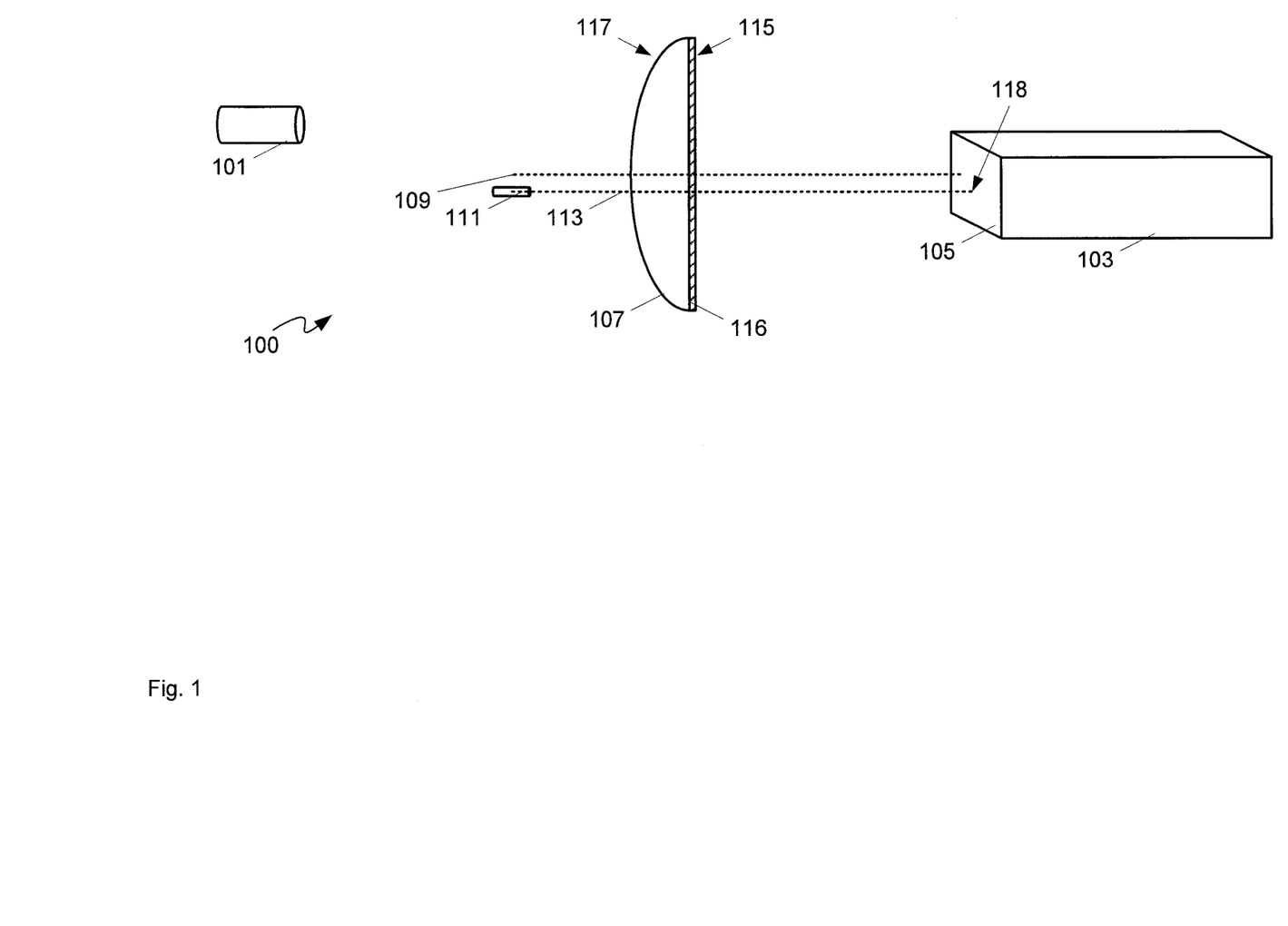
FIG. 1 depicts a device for homogenizing laser light using a rotating lens, according to non-limiting implementations.

Attention is directed to FIG. 1 which depicts a schematic side view of components of a device 100 for homogenizing laser light using a rotating lens, according to non-limiting implementations. Device 100 comprises: a laser 101; an integrating rod 103 having an input face 105; a lens 107 located between laser 101 and input face 105 of integrating rod 103, lens 107 having an optical axis 109, lens 107 positioned to receive light from laser 101, off the optical axis 109, and focus the light through input face 105 of integrating rod 103; and, an actuator device 111 configured to rotate lens 107 about an axis of rotation 113 different from optical axis 109. Hence, lens 107 rotates eccentrically. While not depicted, device 100 can further include a housing, and the like, which contains components thereof. Indeed, device 100 can generally comprise a light source for a projector (not depicted), with light exiting integrating rod 103 being received at optics that convey the light to a light modulator, and the like. Furthermore, device 100 can be provided as a component of a projector and/or as a device separate from a projector, that can be used with a projector.

As depicted, an integrating-rod side 115 of lens 107 is optionally configured to diffuse the light from laser 101. For example, integrating-rod side 115 of lens 107 can be comprise a diffuser 116 (e.g. one or more of a diffusing coating and/or a diffusing film) generally configured to diffuse laser light without, however, changing a general and/or average direction of the laser light exiting integrating-rod side 115 of lens 107. In other words, as the light exiting integrating-rod side 115 of lens 107 is generally contained within a cone, integrating-rod side 115 of lens 107 being configured to diffuse the light from laser 101 causes the cone angle to widen.

Figure 4:
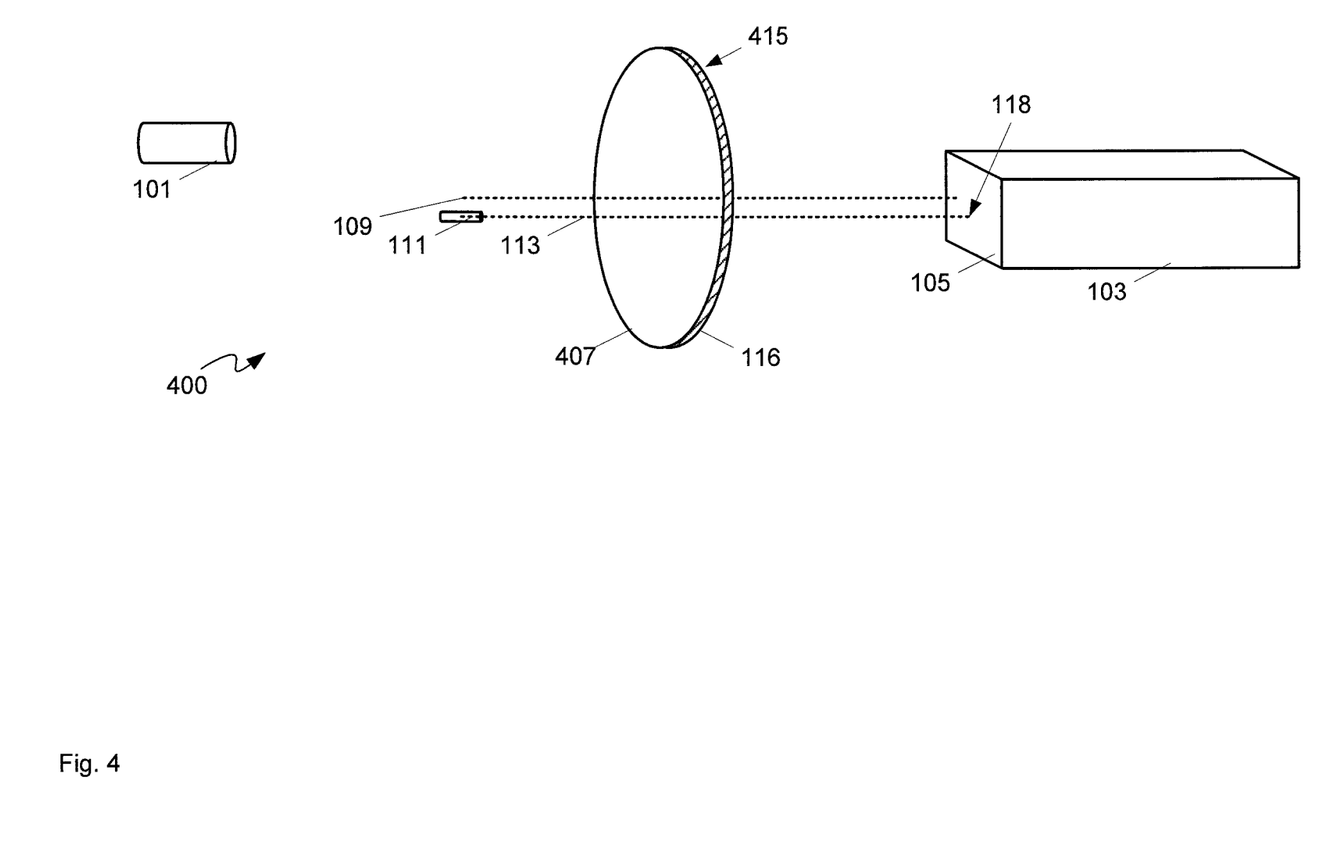
FIG. 4 depicts a device for homogenizing laser light using a rotating lens, according to alternative non-limiting implementations.
Figure 5:
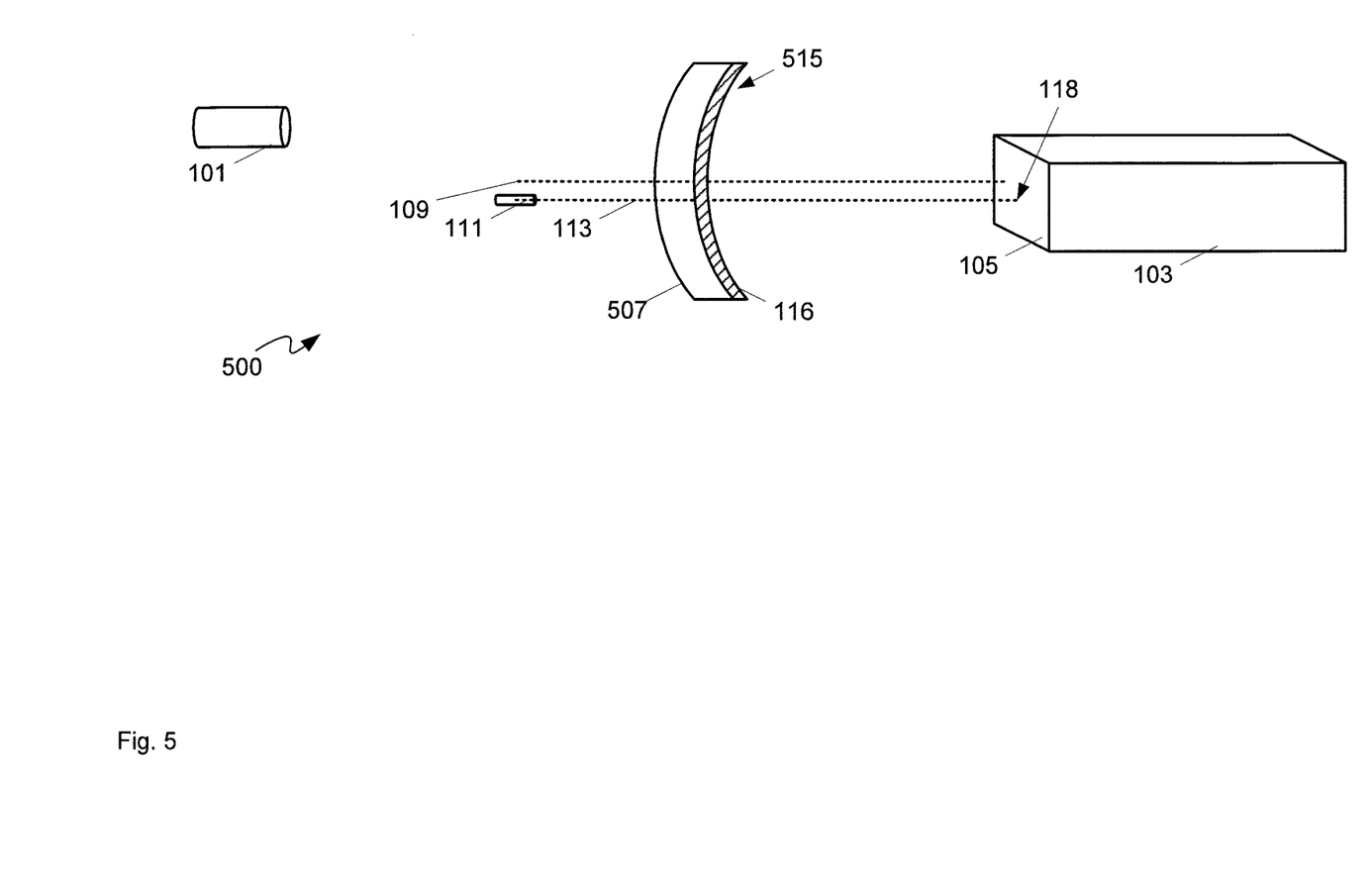
FIG. 5 depicts a device for homogenizing laser light using a rotating lens, according to alternative non-limiting implementations.

As depicted, lens 107 comprises a plano-convex lens, comprising a convex side 117 and a planar side (e.g. integrating-rod side 115) opposite convex side 117, the plano-convex lens positioned to receive light from laser 101 at convex side 117, off optical axis 109, and focus the light through the planar side (e.g. integrating-rod side 115) through input face 105 of integrating rod 103. Hence, as depicted, the planar side (e.g. integrating-rod side 115) of the plano-convex lens is configured to diffuse (e.g. via diffuser 116) the light from laser 101. However, other types of lenses are within the scope of present implementations, as described below with respect to FIG. 4 and FIG. 5.

Optical axis 109 is generally through a centre of lens 107 while axis of rotation 113 is different from optical axis 109; hence, as described below, as lens 107 rotates, optical axis 109 will move about axis of rotation 113 which generally causes lens 107 to rotate asymmetrically and/or eccentrically. Furthermore, as also depicted in FIG. 1, in some implementations, axis of rotation 113 can be about normal to a center 118 of input face 105 of integrating rod 103; however, in other implementations, axis of rotation 113 need not be about normal to a center 118 of input face 105 of integrating rod 103; indeed, as will be described below, as long as lens 107 focuses the light from laser 101 through input face 105 of integrating rod 103 as lens 107 rotates eccentrically, axis of rotation 113 can be in any position relative to input face 105 of integrating rod 103. Furthermore, axis of rotation 113 can generally be fixed relative to input face 105 of integrating rod 103, however in other implementations, axis of rotation 113 can be configured to wobble relative to input face 105 of integrating rod 103 (e.g. actuator device 111 can be configured to cause lens 107 and/or axis of rotation 113 to wobble as lens 107 is rotating); such wobbling can further vary the input position of the light from laser 101 as it is focussed through input face 105.

Actuator device 111 can comprise one or more of a motor and a servo-motor. While not depicted, a drive shaft can extend from the actuator device 111 to lens 107 along axis of rotation 113, and the drive can be attached to lens 107 at a connection point and/or a hub located along axis of rotation 113. Alternatively, lens 107 can be mounted in a rotational hub located along axis of rotation 113 and actuator device 111 can comprise a wheel in frictional contact with lens 107; hence, when the wheel of actuator device 111 rotates, the rotational motion is translated to lens 107 which causes lens 107 to rotate about the rotational hub and hence about axis of rotation 113. In any event, it should be understood that a wide variety of configurations for actuator device 111 are contemplated.

Laser 101 comprises a laser light source configured to generate laser of light of any given color and/or plurality of colors; in particular, laser 101 can comprise a laser light source compatible with projectors, including, but not limited to, a high power laser light source and/or a high brightness laser light source compatible with projectors. Laser 101, lens 107 and input face 105 of integrating rod 103 are positioned relative to each other such that light from laser 101 is focused through input face 105 regardless of a position of rotation of lens 107, as will be described hereafter. Indeed, as also seen in FIG. 1, axis of rotation 113 can be about normal to a centre of input face 105 such that optical axis 109 also rotates about a center of input face 105.

Figure 2:
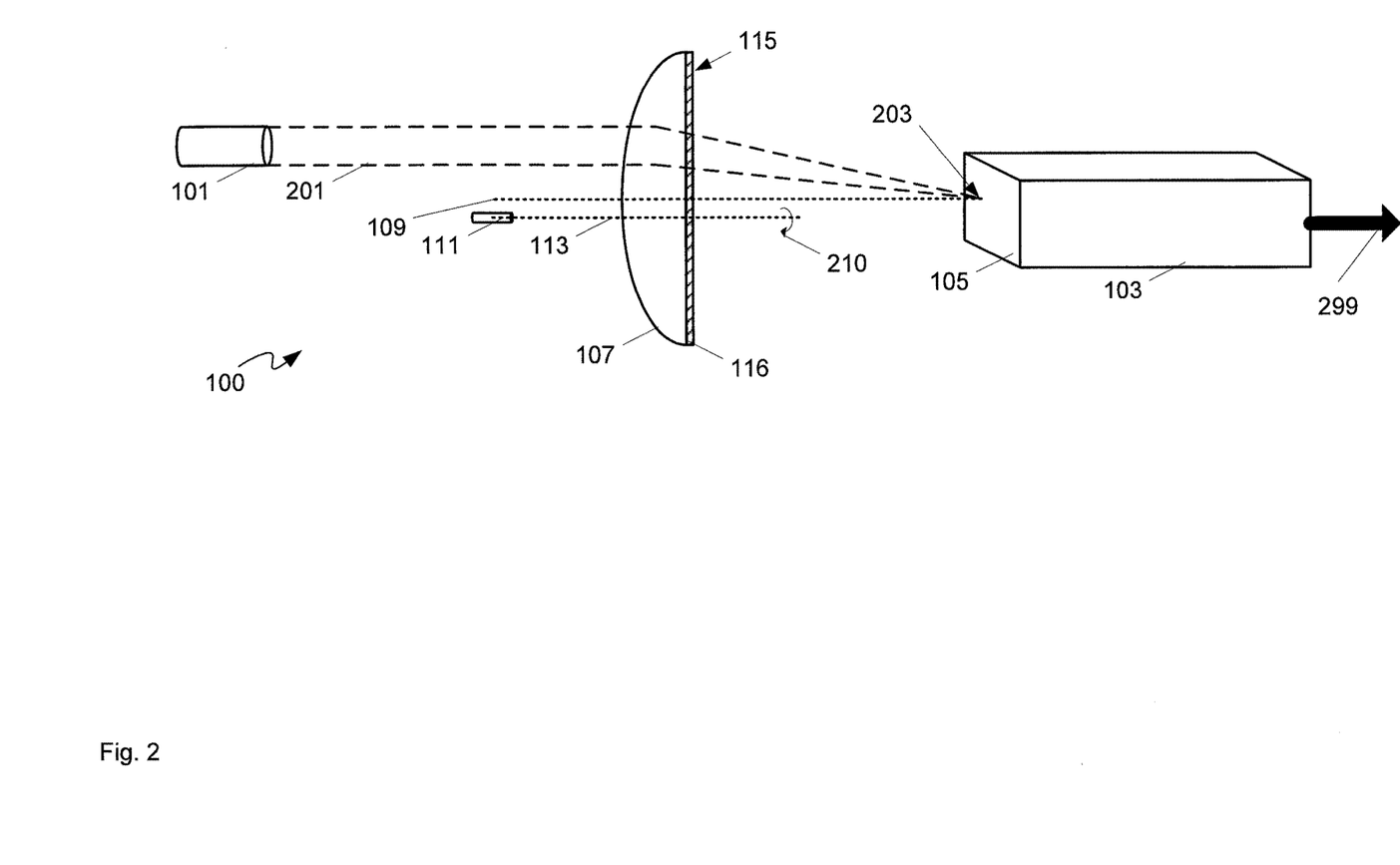
FIG. 2 depicts a light path of the device of FIG. 1 with the lens in a first position, according to non-limiting implementations.

Operation of device 100 will now be described with respect to FIG. 2 and FIG. 3, each of which is substantially similar to FIG. 1, with like elements having like numbers, though center 118 of input face 105 is not indicated for clarity. Indeed, FIG. 2 depicts lens 107 in a same position as in FIG. 1, however FIG. 2 also depicts light 201 from laser 101 (as broken and/or stippled lines), as light 201 exits laser 101, impinges on convex side 117 of lens 107, and as light 201 is focused by lens 107 through input face 105 of integrating rod 103. Indeed, as best depicted in FIG. 2, a focal point 203 of lens 107 can be located at input face 105 of integrating rod 103. Hence, while light 201 has a width, light 201 is focused through input face 105 at focal point 203. However, focal point 203 need not be located exactly at input face 105; for example, focal point 203 can be located proximal input face 105, external or internal to integrating rod 103, and/or at any position where light 201 is focused through input face 105 such that light 201 experiences both a change in an angle of incidence through input face 105 and a positional change.

For example, prior to light 201 being focussed by lens 107, a primary angle of light 201 is about 0° to input face 105 such that if light 201 were to enter input face 105 without being focussed by lens 107, light 201 would generally pass through integrating rod 103 without being integrated. However, lens 107 changes a primary angle of light 201 to primary angles commensurate with the focussing properties of lens 107. As described in further detail below with respect to FIG. 7 and FIG. 8, diffuser 116 further spreads each light ray of light 201 focussed by lens 107 to fill in the angles between the focussed primary angles.

Furthermore, as depicted, lens 107 is rotating about axis of rotation 109 as indicted by arrow 210. Hence, after a period of time, and as depicted in FIG. 3, lens 107 will rotate into a position 180° from the position depicted in FIG. 2. As axis of rotation 113 can generally be fixed with respect to input face 105, optical axis 109 generally moves by 180°, as does focal point 203, regardless of a position of focal point 203 relative to input face 105; in other words, lens 107, optical axis 109 and focal point 203 are all rotating eccentrically. Indeed, as lens 107 eccentrically rotates, light 201 and/or focal point 203 generally sweeps out a pattern at input face 105 of integrating rod 103, as indicated by arrow 310. For example, the pattern that light 201 and/or focal point 203 generally sweeps out can be circular, as depicted. Furthermore, the geometry of components of device 100 is selected such that the focal point 203 remains at a position relative to input face 105 where light 201 is focussed through input face 105, regardless of a position of lens 107. Hence, any lower-angle light that is produced by diffuser 116 (e.g. as diffuser 116 can widen a cone of light 201) experiences different angles of incidence into integrating rod 103, which can minimize their effect, as further described below with respect to FIG. 7 and FIG. 8.

Furthermore, when actuator device 111 is further configured to cause lens 107 and/or axis of rotation 113 to wobble as lens 107 rotates, the pattern formed at input face 105 by focal point 203 and/or light 201 can further vary, which can further vary the angles of light 201 as light 201 enters input face 105. For example, such wobble can be random or such wobble can have a defined pattern.

Figure 3:
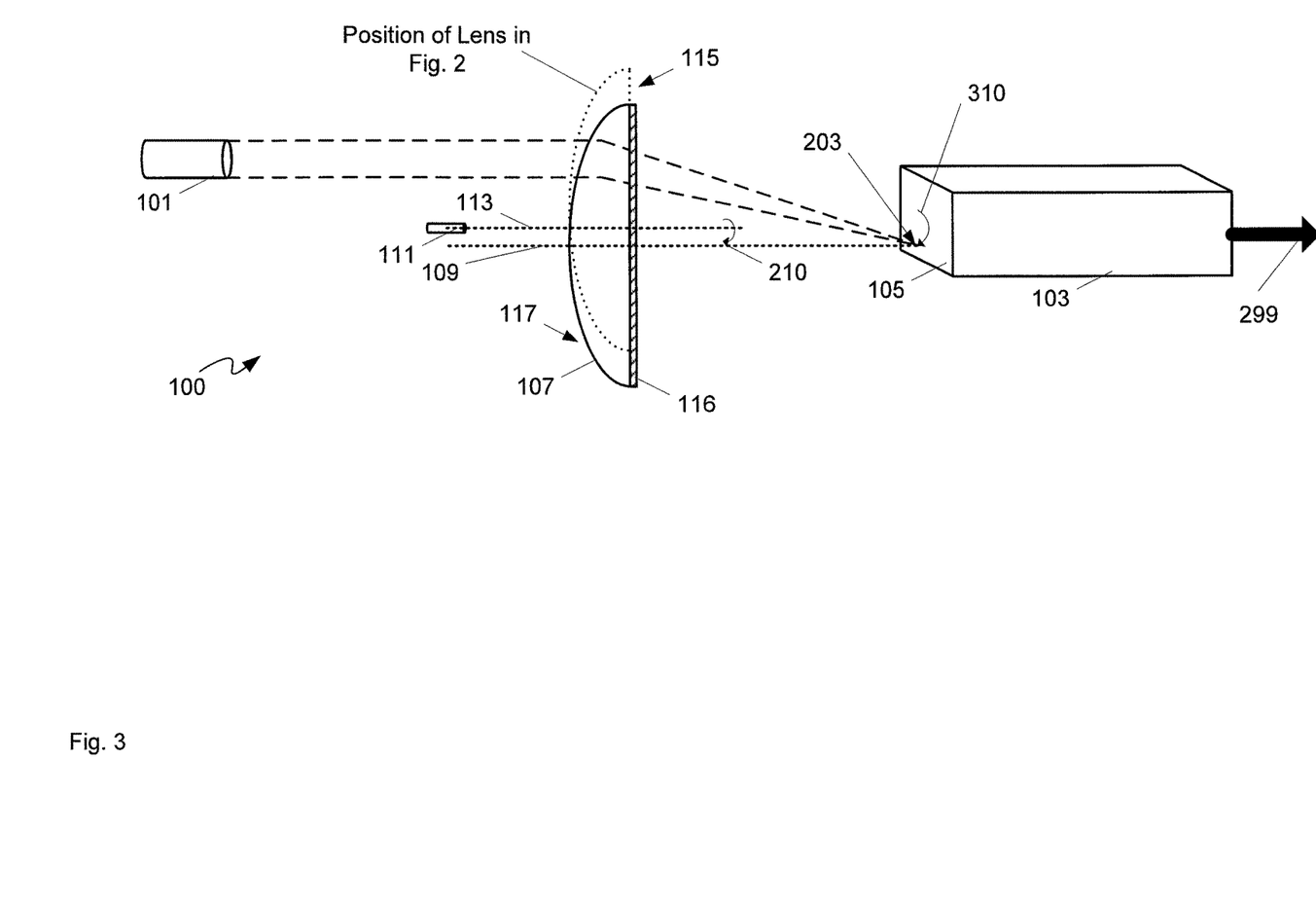
FIG. 3 depicts a light path of the device of FIG. 1 with the lens in a second position, according to non-limiting implementations.

As further depicted in each of FIG. 2 and FIG. 3, integrating rod 103 receives light 201, integrates and/or homogenizes light 201, and homogenized light 299 exits integrating rod 103; homogenized light 299 can be received at further optics and/or conveyed to a light modulator where homogenized light 299 is modulated into images and projected.

Figure 6:
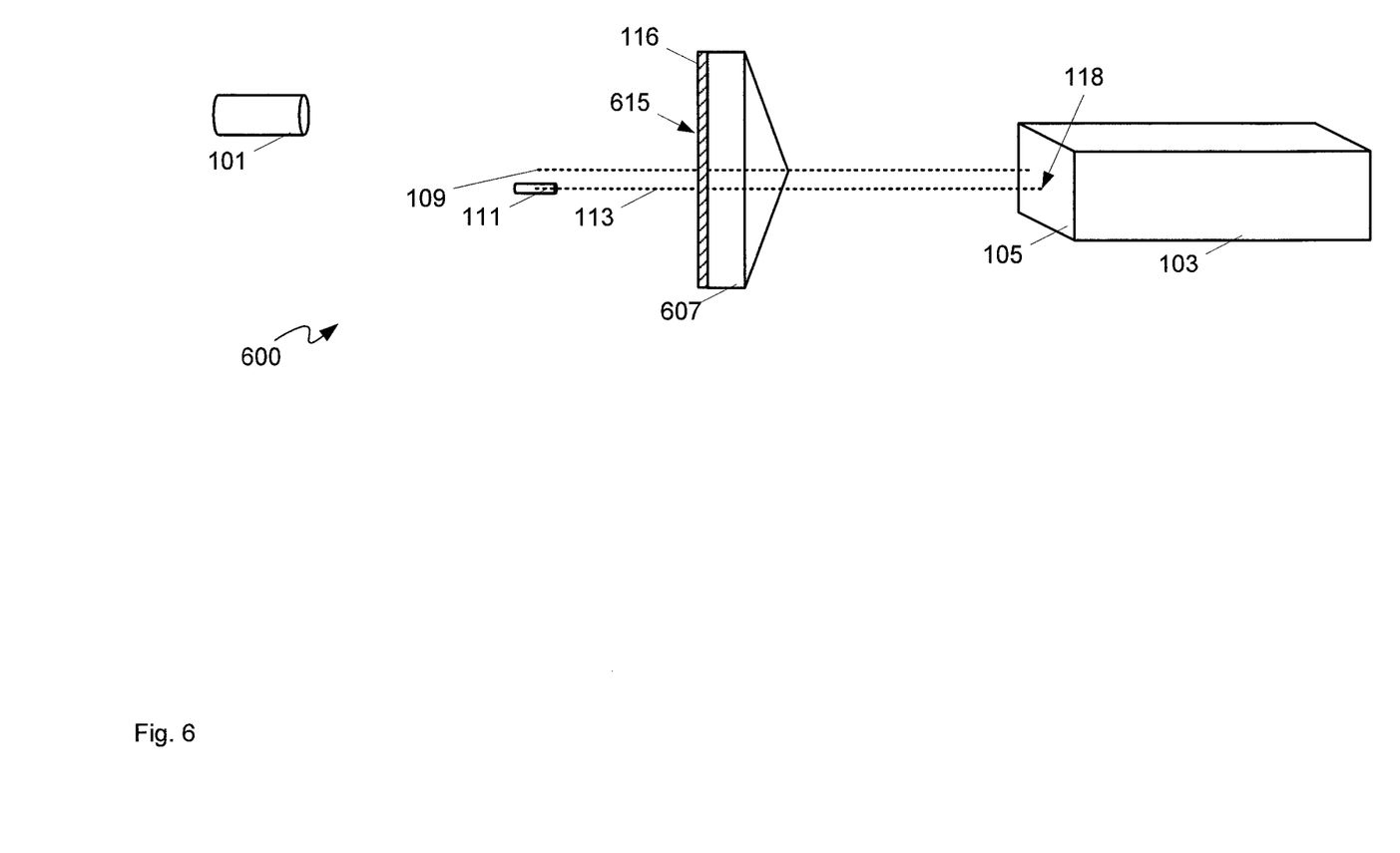
FIG. 6 depicts a device for homogenizing laser light using a rotating lens, according to alternative non-limiting implementations.

Heretofore, devices have been described in which a plano-convex lens is eccentrically rotated to assist in homogenization of laser light. However, other lenses are within the scope of present implementations. For example, attention is next directed to each of FIG. 4, FIG. 5 and FIG. 6 which respectively depict devices 400, 500, 600 that are each similar to device 100, with like elements having like numbers. However, in device 400, plano-convex lens 107 has been replaced with a double-convex lens 407 with an integrating-rod side 415 of double-convex lens 407 optionally configured to diffuse the light from laser 101 (e.g. a shape of diffuser 116 is adapted for integrating-rod side 415 of double-convex lens 407). Similarly, in device 500, plano-convex lens 107 has been replaced with a meniscus lens 507 with an integrating-rod side 515 of meniscus lens 507 optionally configured to diffuse the light from laser 101 (e.g. a shape of diffuser 116 is adapted for integrating-rod side 515 of meniscus lens 507). Similarly, in device 600, plano-convex lens 107 has been replaced with an axicon lens 607; however, in contrast to devices described heretofore, in device 600 a planar side and/or a light-source side 615 of axicon lens 607 is optionally configured to diffuse the light from laser 101 (e.g. a shape of diffuser 116 is adapted for planar light-source side 615 of axicon lens 607). Each of devices 400, 500, 600 otherwise function similar to device 100. Furthermore, while a few specific lens types are described herein, any lens that can be rotated as described above to focus light through input face 105 of integrating rod 103 is within the scope of present implementations.

Persons skilled in the art will appreciate that there are yet more alternative implementations and modifications possible. For example, while each of devices 100, 400, 500, 600 include diffuser 116, diffuser 116 can be optional and any of devices 100, 400, 500, 600 can be provided without diffuser 116.

Furthermore, any of devices 100, 400, 500, 600 can comprise a diffusing plate between a respective lens and a respective input face of an integrating rod in place of, or in addition to, a diffusing coating and/or diffusing film located on a respective lens. In some implementations, such a diffusing plate can be located adjacent a light-source side of a respective lens. Furthermore, a path between each respective lens and a respective input face of an integrating rod can include one or more mirrors and/or other optical elements, which can convey light from the respective lens to the respective input face; such mirrors and/or other optical elements can include diffusing layers.

Figure 7:
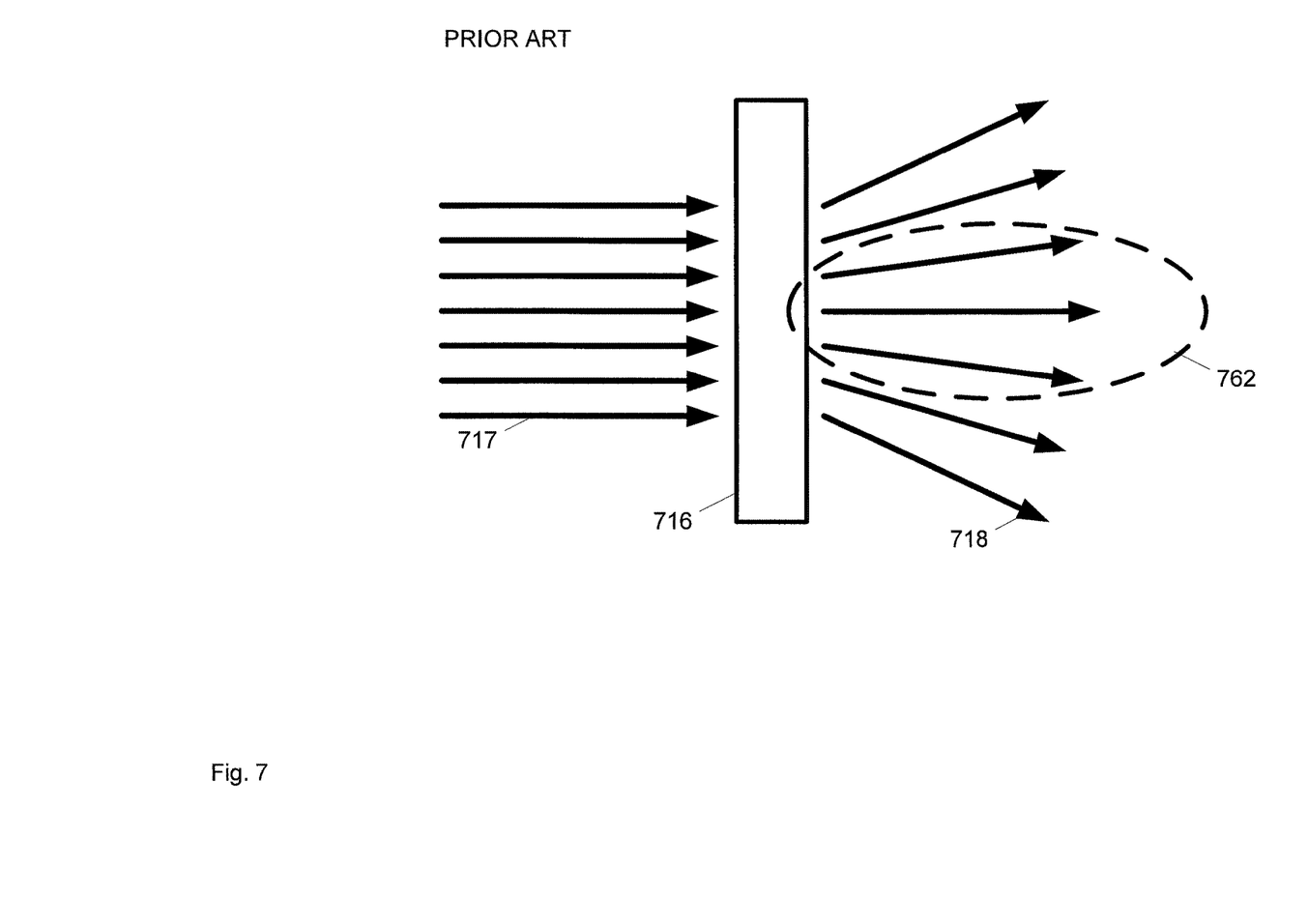
FIG. 7 depicts a portion of a device for homogenizing laser light using a bulk diffuser lens, according to prior art implementations.
Figure 8:
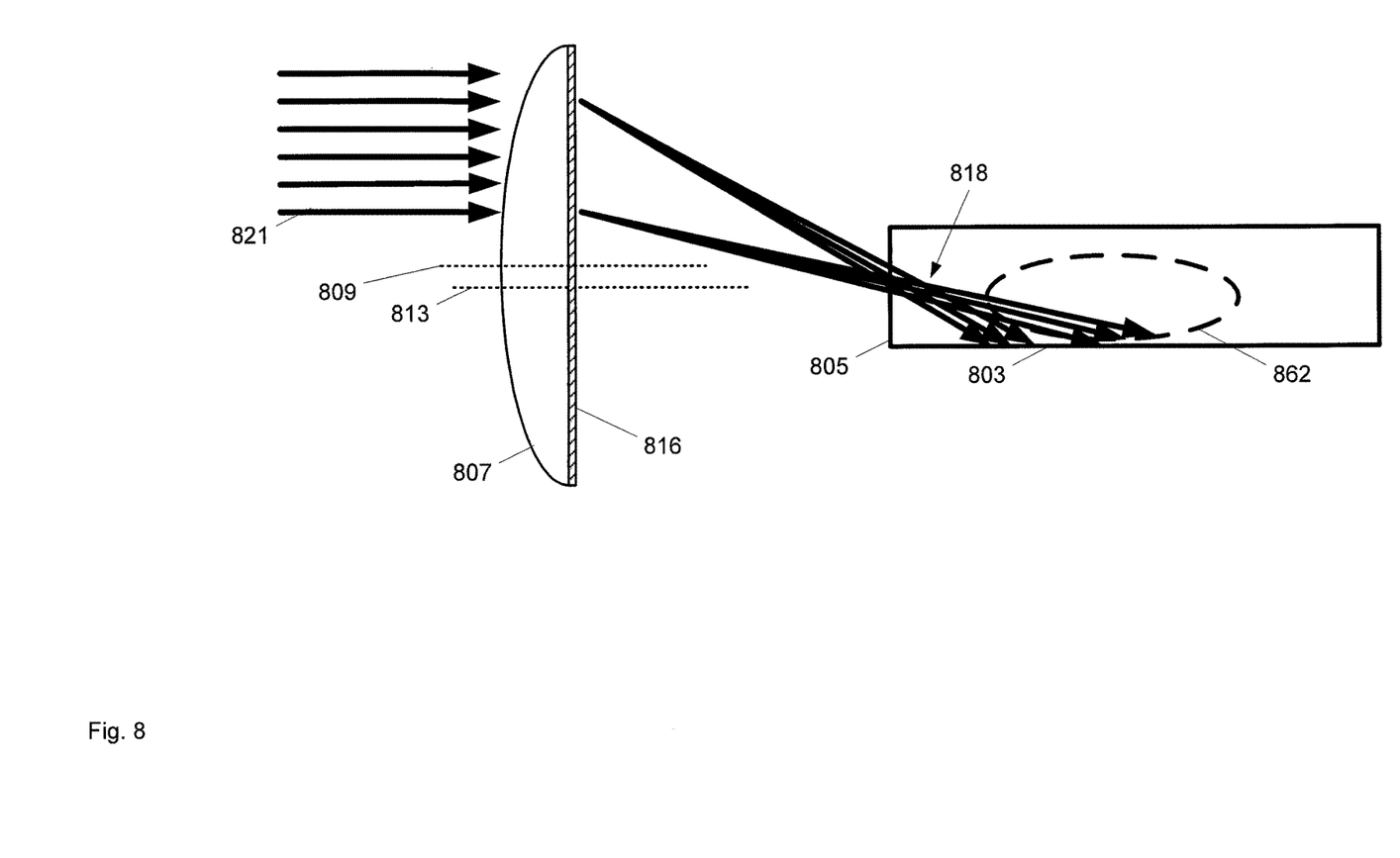
FIG. 8 depicts a reduction in low-level angles of light at a device for homogenizing laser light using a rotating lens, according to non-limiting implementations.

Further operation of devices of the present specification are now described with respect to FIG. 7 and FIG. 8. In particular, FIG. 7 depicts a prior art device in which a bulk diffuser 716 is depicted as diffusing incident laser light 717 to produce diffused light 718, for example with a Lambertian distribution and the like; a portion 762 of diffused light 718 comprises low-angle light, for example light having an angle of less than 3° to a normal of diffuser 716 and/or a normal of an input face of an integrating rod (not depicted) receiving diffused light 718. Such low-angle light can either pass directly through an integrating rod, such as integrating rod 103, or experience too few bounces within the integrating rod to homogenize sufficiently for use by a projector, such that speckle appears in images projected by the projector.

In contrast, FIG. 8 depicts a portion of a side view of components of a device according to present implementations that includes an integrating rod 803 having an input face 805, similar to integrating rod 103 having input face 105, and a lens 807, similar to lens 107, with a diffuser 816, similar to diffuser 116. Hence, lens 807 has an optical axis 809, and lens 807 is positioned to receive light 821 from a laser (not depicted, but similar to laser 101), off optical axis 809, and focus light 821 through input face 805 of integrating rod 803; furthermore, lens 807 is configured to rotate about an axis of rotation 813 different from optical axis 809 for example using an actuator device similar to actuator device 111. Hence, the device depicted in FIG. 8 is similar to devices 100, 400, 500, 600. However, in the device depicted in FIG. 8 a focal point 818 of lens 807 is located inside integrator rod 803, proximal input face 805, rather than at input face 805. In any event, as lens 807 focuses light through input face 805, low-angle light is reduced as compared to the device of FIG. 7, and efficiency can be improved as compared to the device of FIG. 7. in particular, homogenization of light 821 can be improved over homogenization of light 717 as low-angle light (e.g. light having an angle of less than 3° from a normal of input face 805 and/or from optical axis 809) can be reduced in the device of FIG. 8 as compared to the device of FIG. 7, as can efficiency of throughput of light through an integrating rod, as described hereafter.

For example, lens 807 changes a primary angle of light 821 to primary angles commensurate with the optical and/or focussing properties of lens 807. In other words, light rays of light 821, prior to interacting with lens 807, generally have one primary angle that is about 0° to input face 805, and lens 807 changes the primary angle to a plurality of focussed primary angles as focussing occurs, the optical and/or focussing properties of lens 807 selected so that the focussed primary angles of light 201 after focussing generally minimize low-angle light. However, due to diffuser 816, some low-angle light remains, as indicated by portion 862, analogous to portion 762 of FIG. 7. In other words, rotating lens 807 performs a bulk "shifting" of a primary angle of light 821 (prior to focussing) away from going straight through integrating rod 803 (low-angle light), and diffuser 816 performs local spreading of each light ray of focussed light 821 so that all and/or most angle space is filled. Hence, in general, diffuser 816 can cause focussed light 821 to fill in angles between the focussed primary angles, as determined by the optical properties of lens 807. However, with reference to FIG. 6, in some implementations a diffuser can be located on a laser-facing side of a lens, and a similar effect will occur, with the diffuser causing incident light to diffuse prior to focussing.

Such spreading and/or filling-in results in a portion 862 of focussed light 821 being low-angle light, portion 862 being analogous to portion 762 of the device of FIG. 7. However, due to lens 807 focussing light 821 through input face 805, portion 862 is reduced as compared to portion 762 produced using a bulk diffuser 716, and further due to the focusing of light 821 by lens 807, the efficiency of focussed light 821 entering integrating rod 803 is higher than use of an integrating rod with bulk diffuser 716. Furthermore, as the angle spread of the focussed light 821 is higher as compared to systems with no lens, and as the light is focussed into integrating rod 803, integrating rod 803 can better integrate focussed light 821.

Furthermore, by offsetting the focal point of lens 807 from a center axis of integrating rod 803 and/or a center of input face 805, and rotating lens 807 as described above, lower-angle light produced by lens 807 enters integrating rod 803 closer to a side of integrating rod 803 which can increase the number of bounces within integrating rod 803.

Furthermore, as lens 807 rotates about axis of rotation 813, focussed light 821 entering integrating rod 803 will also rotate as described above, further contributing to the homogenization thereof. In other words, lens 807 is generally configured to focus light 821 through input face 805 of integrating rod 803 at angles greater than about 3° from a normal from input face 805 of integrating rod 803.

Hence, provided herein is a device that includes a laser, an integrating rod and an eccentrically rotating lens that focuses light from the laser through an input face of the integrating rod as the integrating rod eccentrically rotates.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device for homogenizing laser light, the device comprising:
    a laser;
    an integrating rod having an input face;
    a lens located between the laser and the input face of the integrating rod, the lens having an optical axis, the lens positioned to receive light from the laser, off the optical axis, and focus the light through the input face of the integrating rod at a focal point located at one of: at the input face of the integrating rod; proximal the input face of the integrating rod, external to the integrating rod; and proximal the input face of the integrating rod, internal to the integrating rod; and,
    an actuator device configured to rotate the lens about an axis of rotation different from the optical axis, wherein the axis of rotation is about normal to a center of the input face of the integrating rod, and when the lens is rotated about the axis of rotation, the focal point sweeps out a pattern at the input face of the integrating rod.

2. The device of claim 1, wherein the axis of rotation is fixed relative to the input face of the integrating rod.

3. The device of claim 1, wherein the lens is configured to focus the light through the input face of the integrating rod at angles greater than about 3° from a normal from the input face of the integrating rod.

4. The device of claim 1, wherein the actuator device is configured to cause one or more of lens and the axis of rotation to wobble as the lens is rotating.

5. The device of claim 1, wherein an integrating-rod side of the lens is configured to diffuse the light.

6. The device of claim 1, wherein, when the lens is rotated about the axis of rotation, the optical axis of the lens moves about the axis of rotation.

7. The device of claim 1, wherein the actuator device configured to rotate the lens comprises one or more of a motor and a servo-motor.

8. The device of claim 1, wherein the lens comprises a plano-convex lens comprising a convex side and a planar side opposite the convex side, the plano-convex lens positioned to receive light from the laser at the convex side, off the optical axis, and focus the light through the planar side through the input face of the integrating rod.

9. The device of claim 8, wherein the planar side of the plano-convex lens is configured to diffuse the light.

10. The device of claim 1, wherein the lens comprises a double-convex lens.

11. The device of claim 10, wherein an integrating-rod side of the double-convex lens is configured to diffuse the light.

12. The device of claim 1, wherein the lens comprises a meniscus lens.

13. The device of claim 12, wherein an integrating-rod side of the meniscus lens is configured to diffuse the light.

14. The device of claim 1, wherein the lens comprises an axicon lens.

15. The device of claim 14, wherein a planar side of the axicon lens is configured to diffuse the light.

* * * * *